United States Patent [19]
Kemp

[11] Patent Number: 5,644,902
[45] Date of Patent: Jul. 8, 1997

[54] APPARATUS AND METHOD FOR A DOG PACK HARNESS

[76] Inventor: Brian J. Kemp, 4949 N. Broadway #101A, Boulder, Colo. 80304

[21] Appl. No.: 512,169

[22] Filed: Aug. 7, 1995

[51] Int. Cl.⁶ ................................................ B68C 1/00
[52] U.S. Cl. ............... 54/37.1; 119/858; 224/905
[58] Field of Search ............... 54/37.1; 119/858; 224/148.1, 905

[56] References Cited

U.S. PATENT DOCUMENTS

| | | |
|---|---|---|
| 199,067 | 1/1878 | Hoff . |
| D. 272,428 | 1/1984 | Kelley ................................. D12/158 |
| D. 293,139 | 12/1987 | Roa ..................................... D30/152 |
| D. 313,677 | 1/1991 | Hammon et al. ................... D30/152 |
| D. 325,267 | 4/1992 | Ferguson ............................ D30/152 |
| D. 330,273 | 10/1992 | Cernek ................................ D30/152 |
| D. 355,297 | 2/1995 | Ash, Jr. .............................. D3/217 |
| 698,329 | 4/1902 | Sengelaub . |
| 893,199 | 7/1908 | Schaller ............................. 54/37.1 |
| 1,040,016 | 10/1912 | Robbins . |
| 1,508,601 | 9/1924 | Huff . |
| 1,614,083 | 1/1927 | Plantico . |
| 2,504,738 | 4/1950 | Shields .............................. 224/43 |
| 2,605,744 | 8/1952 | Urbanski . |
| 3,349,978 | 10/1967 | Little et al. ..................... 224/905 X |
| 4,171,760 | 10/1979 | Gay .................................. 224/241 |
| 4,528,944 | 7/1985 | Reed et al. . |
| 4,530,309 | 7/1985 | Collins . |
| 4,559,906 | 12/1985 | Smith . |
| 5,184,762 | 2/1993 | Nevitt .............................. 224/148 |
| 5,199,383 | 4/1993 | Lagana . |
| 5,427,061 | 6/1995 | McCullough ..................... 119/771 |

FOREIGN PATENT DOCUMENTS

| | | | |
|---|---|---|---|
| 840529 | 5/1984 | Canada ........................... 224/3 |
| 25001 | 10/1906 | United Kingdom .............. 54/37.1 |

OTHER PUBLICATIONS

Sporting Dog Specialties Midwinter 1989 p. 11.
Sporting Dog Specialties, Inc. Box 68 Spencerport, NY 14559 p. 33, Dec. 31, 1979.
Wholesale Vererinary Supply Box 2256, Rockford, IL 61131 p. 27, 1992.

*Primary Examiner*—Robert P. Swiatek
*Attorney, Agent, or Firm*—Thomas J. Loran

[57] ABSTRACT

An apparatus and method enabling a dog to carry one pack or a plurality of packs near the front and top of the dog's back thereby providing comfort and stability to the dog. The apparatus includes a flexible surface member for holding packs, a Y-shape strap assembly for maintaining the flexible surface member in a desired position and additional strap assembly for maintaining the flexible member.

16 Claims, 3 Drawing Sheets

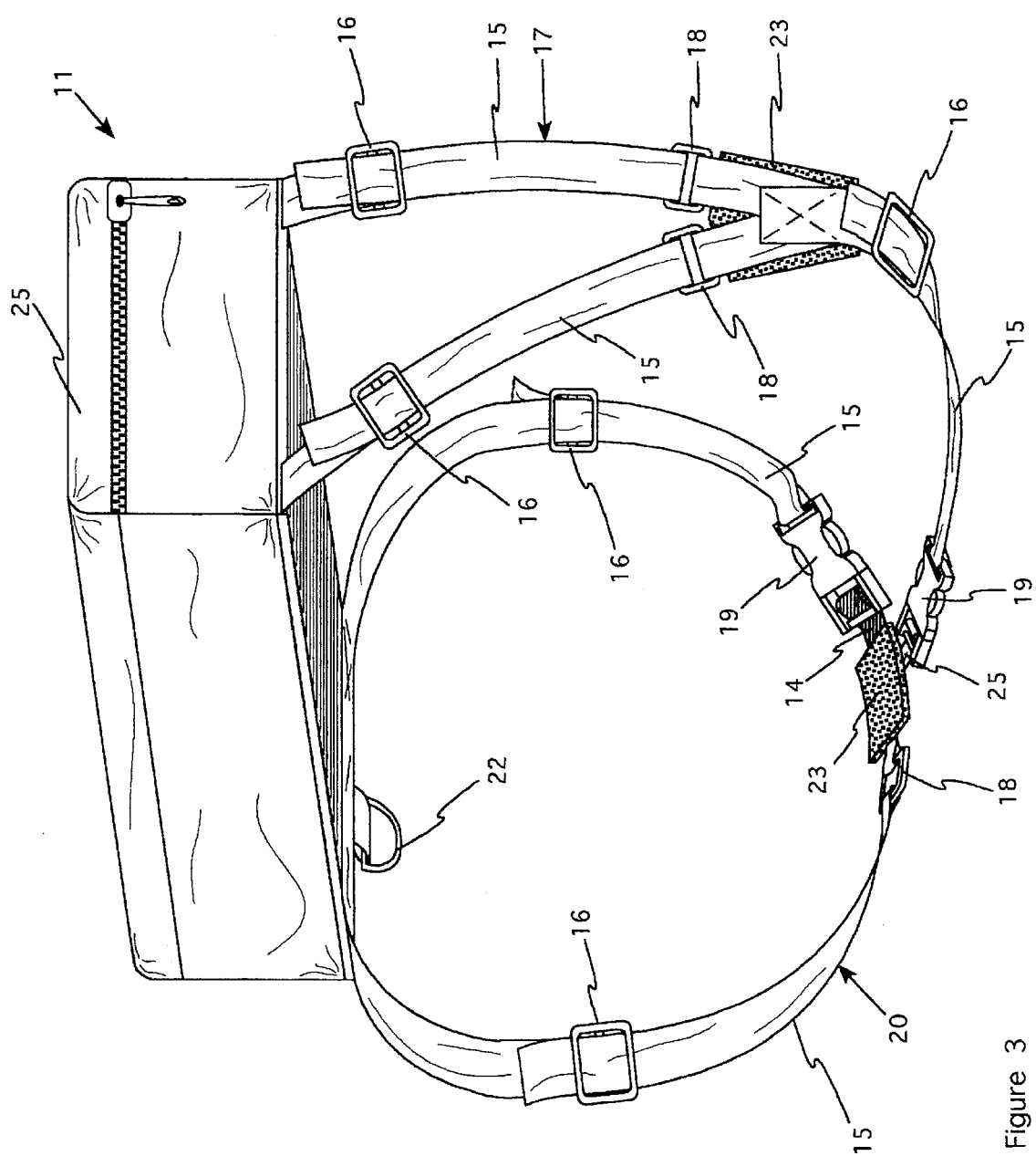

APPARATUS AND METHOD FOR A DOG PACK HARNESS

BACKGROUND OF THE INVENTION

1. Field of the Invention

The present invention is generally directed to an apparatus and method enabling a dog to carry one pack or a plurality of packs near the front and top of the dog's back thereby providing comfort and stability to the dog.

2. Description of the Prior Art

Dogs have been always used to carry many objects by travois or by attaching packs on their sides. All of these devices limit the dogs maneuverability. Side bags, such as advertised in prior art catalogs, are supported by the dogs back, chafe the dog's back and sides, may affect dog's balance, and impede the dogs natural abilities. U.S. Pat. No. 5,184,762; U.S. Pat. No. Des. 313,677; and Canadian patent CA 1168-198-A also describe and depict these apparatus.

A problem with many pack harnesses relates to the position of attaching a load on an animal. Most position the pack so the load is carried primarily by the middle of animal's back with supports to confine the load to the sides of the animal. The harness is designed to distribute the load over the animal's back, between the front and back legs, and mount the load on the animal's sides. These loads need to be continually balanced so the animal is comfortable. Single loads mounted on sides of animals need to be separated into relatively equal weights and sizes. Dogs need mobility and balance for climbing or running during hikes and side packs can chafe the dog's fur in addition to limiting the dog's natural instincts walking, running, or seeking natural relief. Side packs do not allow the dog to conduct rescue missions due to the dog's lack of mobility.

U.S. Pat. Nos. 1,614,083 and D293,139 describe and show harnesses to restrain dogs. These are not designed for load carrying because of positioning for choke features or lack of design to prevent shifting of loads.

The load carrying harnesses in the prior art do not allow for the dog's natural chest expansion that normally occurs during exertion. In the present invention, positioning the dog's load on the top of the back and the front of the back, while allowing chest expansion, maintains the dog's comfort, stamina, and natural running and climbing abilities without chafing.

SUMMARY OF THE INVENTION

The invention is a method and apparatus that maintains a load for a dog to carry on a hike or rescue mission. The apparatus includes a flexible surface member means for attaching a single pack or a plurality of packs, that will be centrally located on the front and top of the dog's back. This pack location, maintained in a stable position, allows the dog to run, climb, and perform natural instincts with minor impediments from the load.

The means to maintain the flexible surface member and the load includes a Y-shape front adjustable strap, each top strap properly spaced to connect to the front of the flexible surface. Each of these adjustable top straps passes in front and over the dog's each shoulder, joining in front of the chest, and connecting into a single bottom of the Y shape strap with an adjustable strap clasp and a buckle means for securing the single strap. This single Y shape strap buckle means connects to the branch of a tee shape means for securing straps under the dog's chest that is also connected to a second strap means for securing and positioning the pack. The Y-strap maintains the front load position on the top and front of the back.

A second strap means for positioning and maintaining the load has two approximately equal length sections, each connected to the approximate center of each periphery side of the flexible surface member. The straps pass under the dog's chest, having separate adjustments on each half of strap to adjust the straps to equal lengths. The second strap means and all other strap means may contain an elastic means to automatically adjust length to the dog's chest size during exertion and a buckle means for attaching straps. A tee shape means for connecting the two sections of the second strap and the single bottom portion of the Y shape strap means allows individual connecting and disconnection of each strap means. The combination of the flexible surface member means with attached packs providing stable areas of maintaining the load on top of the dog's back, the Y-shape strap means maintaining a front rigid position, and the second strap means provide a stable and comfortable load for a dog.

A third adjustable and removable strap means maintaining the load position connects on a rear peripheral side of the flexible surface member means, passes under the dog behind the chest, and connects on the opposite peripheral rear side of the flexible surface member. A buckle means for temporarily securing the third strap means and allowing removal of the pack is provided. For smaller loads this third strap means position may be replaced by the second strap means and the third strap means eliminated. On each buckle means there is a protective pad to isolate the buckle from the dog's fur.

The packs may include provisions for water bottles, leash, dog excretion containers, first aid kits, and other supplies. A single pack may contain tracking device and first aid kits for dogs to locate lost or injured people where access by humans is delayed. The invention allows the dog to proceed on rescues with little hindrance. A loop means for attaching a leash may be added on the center of the rear peripheral edge of the flexible surface means.

Accordingly, an object of the invention is to provide an apparatus and method for mounting a pack on a dog to provide comfort, stability, and will not interfere with the dogs natural functions.

Another object of the invention is to provide an apparatus and method with a Y shape front harness over the dog's chest and a body harness to stabilize a load located on the top and front of the dog's back.

Another object of the invention is to provide an apparatus and method for mounting a pack on a dog that provides little charting, fully adjustable straps, a means to allow for chest expansion, and is easily removed.

Another object of the invention is to provide a pack on the dog's upper back that allows a dog to reach disabled or lost people with relief supplies with minimum interference of the dog's abilities.

BRIEF DESCRIPTION OF THE DRAWINGS

FIG. 3 is a front perspective view of a single pack means for containing a load where the pack bottom forms a flexible surface means, another embodiment of strap means for mounting a pack on a dog.

DETAILED DESCRIPTION OF THE PREFERRED AND OTHER EMBODIMENTS

Figure 1:
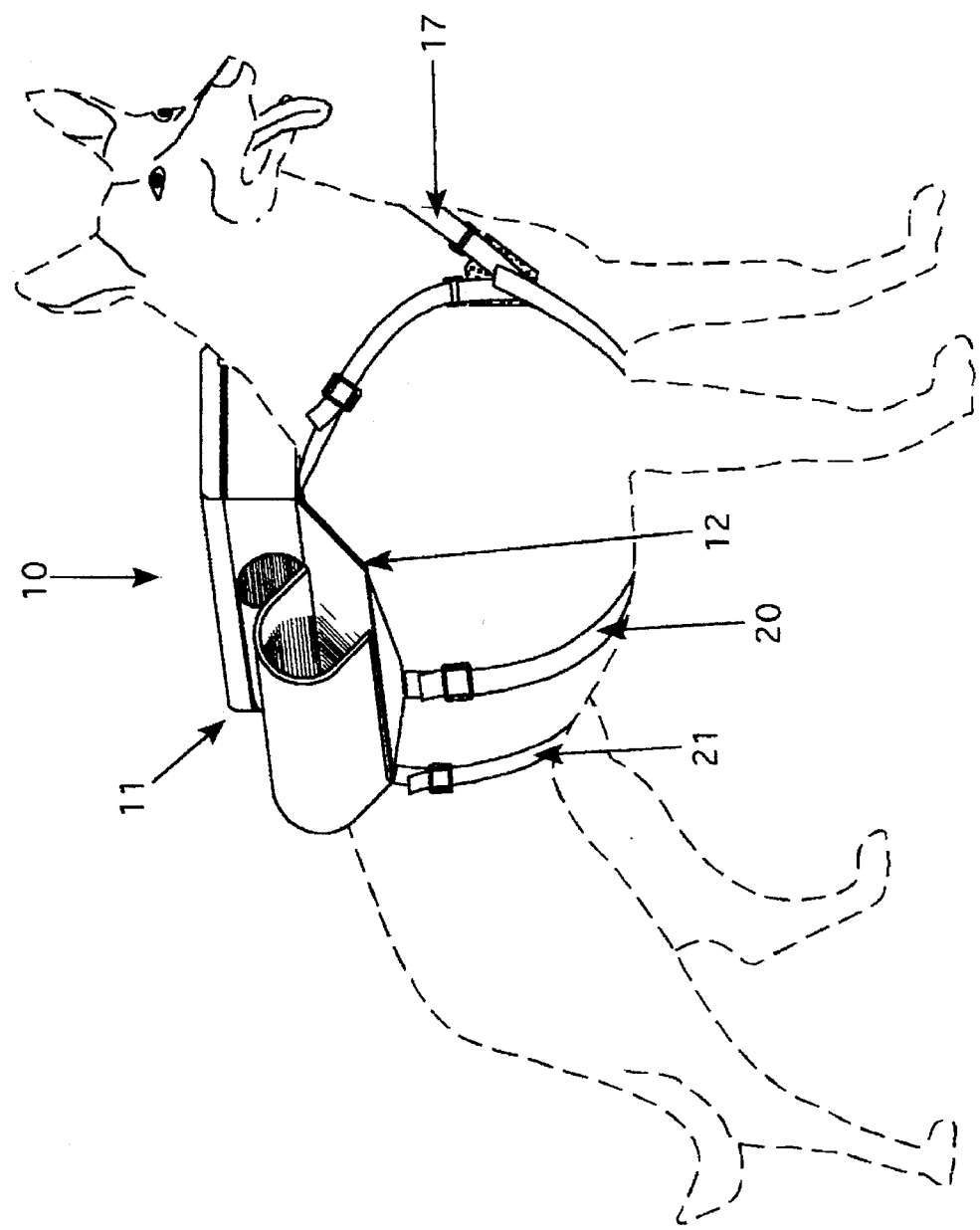
FIG. 1 is a perspective drawing of a method and apparatus for mounting a pack on a dog.

The present invention method and apparatus shown in FIG. 1 perspective view indicate the mounting position of a dog pack 10 on the front section and top of a dog's back. A Y-shape strap assembly means 17 for maintaining the load attaches to a flexible surface member means 12 for holding a plurality of pack means 11 for containing loads. The dog's shoulders provides stability and controls the load placement. The location of the flexible surface member and load packs on the top and front of the dog allows the dog to carry the load in an easily balanced position, a position that does not interfere with running, walking or climbing, and a position that does not appreciably affect his center of gravity. The load is easily balanced and the forward location is more comfortable. A second strap assembly means 20 for maintaining the load and a third strap assembly means 21 for maintaining the load while providing additional support when attached to the flexible surface means complete the apparatus and show the method of supporting a load.

Figure 2:
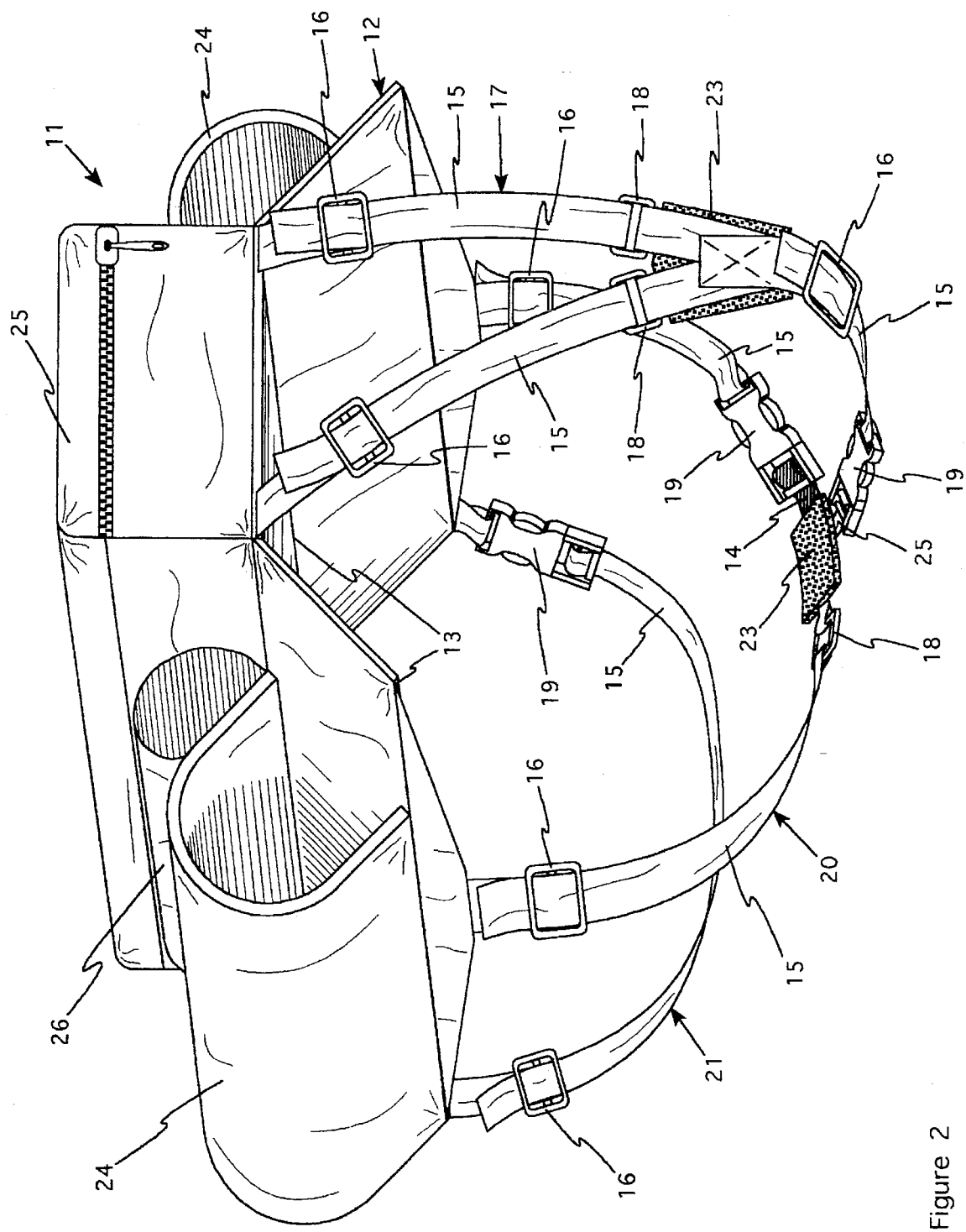
FIG. 2 front perspective view of the apparatus for mounting a pack on a dog.

FIG. 2, a front perspective view of the pack, shows the flexible surface member means 12 for holding packs that is placed on the dog's back in a top and forward position. This flexible fabric may be constructed from natural fibers, leathers, plastic sheeting, or woven plastic fibers. A double surface with padding between the surfaces provides more protection and comfort to a dog although a single surface may be used with or without padding. Preferred plastic materials are polyamides including Nylon™ and polyesters. The flexible surface member shape may be rectangular, multi-sided, oval, or any combination of these shapes. The pack's bottom surface may function as the flexible surface member means for holding the loads and attaching to the strap means but a separate flexible surface means is preferred. The surface member may include pieces or strips joined together. Folds or seams 13 may be used in larger flexible surface members to provide a conforming shape to a dog but are not necessary for some flexible surface member or pack designs.

All straps, belts, or cords 15 included in the means for maintaining the pack may be any width or thickness having suitable strength with one inch wide and one sixteenth inch thickness preferred for larger dogs and constructed from any plastic or natural fabric, leather, polymer plastic strips, or woven fabric cords, with Nylon or polyesters being preferred materials. A clasp means 16 for adjusting the length is used in each strap means. This allows a double thickness of strap means 15 passing through a metal clasp 16 or similar device to adjust and maintain desired lengths. Adjustable straps are not necessary for all locations but are preferred. The clasp means may be metal or plastic having the desired strength.

The two adjustable top straps 15 in the Y-shape strap assembly means 17 for maintaining the flexible member with loads in the proper position are attached in similar manner as other straps 15 to the flexible surface member means 11 by sewing, glue, rivets, welding, or other suitable means. Each adjustable strap is attached to or joins the single bottom strap passing through a coupling means 18 for adjustments such as a metal or plastic link that allows adjustment or other similar linking means. For some packs, non-adjustable strap means may be used in any pack location. The bottom single strap of the Y-shape strap also has a clasp means 16 for adjustment. A buckle means 19 for temporarily joining straps is used. These buckle means are preferably plastic made by National Molding, Farmingdale, N.Y., a push squeeze design. Other means include cam lock hinges, metal buttons and metal buckles of various shapes and designs including belt buckles may also be used. The buckle means 19 may have an integral coupling means 18. The Y-shape strap assembly means 17 removably connects to a second strap assembly means 20 for maintaining the load through the branch of a tee shaped means 25 for connecting three straps. The Y-shape strap assembly means 17 maintains the load on the top of the dog's back and to the front of the dog's back. The tee shape means may have buckle means near the tee or on the straps located away from the tee shape means.

A second strap assembly means 20 for maintaining the load consists of two straps and fastens on opposing positions, rearward of the Y-shape strap means, on the flexible surface member means 12. The second strap assembly means extends under the dog's chest with adjustable straps 15, with each strap connecting by a coupling means 18 into the tee shape means. Either strap has a buckle means 19 for joining straps during assembly or disassembly of the apparatus. With two buckles connecting the tee means 25, the strap assembly means 17 and strap assembly means 20 may be easily removed. The straps may contain an elastomer means 14 for providing additional length to the strap assembly as the dog's chest may expand. The elastomer means may be constructed from buna, neoprene or polyurethane or other polymers or fabric and polymer mixtures. The combination of the Y-shape strap assembly means 17, the flexible surface member means 12 and the second strap assembly means 20 for maintaining the load position provide stability for the load and prevent shifting.

For larger or longer loads a third strap assembly 21 provides additional pack support, distributes weight more evenly, and maintains the position of the load. Adjustable strap 15 having a buckle means 19 for assembly or removal passes under the dog and supports larger packs. For some packs, especially lighter and more compact packs, strap assembly means 20 may be placed near the back of the flexible surface member and the third strap assembly 21 may not be needed.

Under the buckle means 19 and areas under any strap means that may provide a tension, a protective cushion material 23 may be positioned to provide comfort to the dog. These may be elastomers including foams or fibers such as wool or cotton than may be encased in a fabric.

FIG. 2 also shows various pack designs showing a plurality of pack means 11 for containing loads. These may include pocket shapes 24, 25 to hold water bottles, first aid kits for dogs and people or a removable pack held on by Velcro™, a loop and hook attachment, or other temporary means such as moveable pressure seals including zippers, clips, or straps. One pack 26 may hold disposable bags for collecting dog's excretion or any other desired items. The packs may be pockets with an opening or with temporary enclosures by Velcro™, moveable pressure seals, draw stings, or straps to prevent debris from entering and to restrain the load items. The pack means may be constructed from flexible material similar to the flexible surface member means or rigid materials.

FIG. 3 shows a single pack means 25 for containing loads such as, for example, signal devices emitting beacons or radio devices with a first aid kit for people rescue purposes. FIG. 3 also shows a view of the pack bottom providing the flexible surface member means function. This pack uses strap assembly means 20 as a replacement for strap assembly 21. Centrally attached on the back center periphery of the flexible surface member means is a means 22 for attaching a leash. These means for attaching a leash include a metal ring or D shape coupling device or any metal or plastic, or natural fiber material attached to the flexible surface member means.

From the above description of the invention, various changes and modifications to the apparatus and method will occur to those skilled in the art. All such modifications coming from within the scope of the amended claims are intended to be included therein.

I claim:

1. An apparatus enabling a dog to carry loads comprising:
   (a) a pack means for containing loads and a flexible surface member attached under said pack means,
   (b) a Y-shape strap assembly means for maintaining said flexible surface member in a desired position, said Y-shape strap assembly means upper double ends attached to the front of said flexible surface member and opposing single end of said Y-shape strap assembly means to an unopposed end of a tee shape means for connecting three straps,
   (c) a second strap assembly means for maintaining said flexible surface member in a desired position having two sections, each attached centrally to said flexible surface member with each opposing end attached to an opposing end of said tee shape means and,
   (d) a third strap assembly means for maintaining said flexible surface member in position having opposing ends opposingly attached to said flexible member means rearward of said second strap assembly means.

2. An apparatus enabling a dog to carry loads as recited in claim 1 wherein said pack means is a plurality of packs.

3. An apparatus enabling a dog to carry loads as recited in claim 1 wherein said Y-strap assembly means and said second strap assembly means and said third strap assembly means have a buckle means for assembling and disassembling said apparatus.

4. An apparatus enabling a dog to carry loads as recited in claim 1 wherein said Y strap assembly means, said second strap assembly means and third strap assembly means have an elastic means for providing additional length.

5. An apparatus enabling a dog to carry loads comprising:
   (a) a pack means for containing loads and a flexible surface member attached under said pack means for containing said loads,
   (b) a Y-shape strap assembly means for maintaining said flexible surface member in a desired position, said Y-shape strap assembly means upper double ends attached to the front of said flexible surface member and opposing single end of said Y-shape strap assembly means to an unopposed end of a tee shape means for connecting three straps and,
   (c) a second strap assembly means for maintaining said flexible surface member in a desired position having two sections, each attached rearward to said flexible surface member with each opposing end attached to an opposing end of said tee shape means.

6. An apparatus enabling a dog to carry loads as recited in claim 5 wherein said pack means is a plurality of packs.

7. An apparatus enabling a dog to carry loads as recited in claim 5 wherein said Y-strap assembly means and said second strap assembly means have a buckle means to assemble or disassemble said apparatus.

8. An apparatus enabling a dog to carry loads as recited in claim 5 wherein said Y-strap assembly means and said second strap assembly means have an elastic means for providing additional length.

9. A method for enabling a dog to carry loads comprising the steps of:
   (a) providing a pack means for containing loads and a flexible surface member attached under said pack means,
   (b) attaching a Y-shape strap assembly means for maintaining said flexible surface member in a desired position, said Y-shape strap assembly means having upper double ends attached to the front of said flexible surface member and opposing single end of said Y-shape strap assembly means attached to an unopposed end of a tee shape means for connecting three straps and,
   (c) attaching a second strap assembly means for maintaining said flexible member in a desired position having two sections, each attached rearward to said flexible surface member with each opposing end attached to an opposing end of said tee shape means.

10. A method for enabling a dog to carry loads as recited in claim 9 wherein said pack means is a plurality of packs.

11. A method for enabling a dog to carry loads as recited in claim 9 wherein said Y-strap assembly means and said second strap assembly means have a buckle means for assembling and disassembling said strap assembly means.

12. A method for enabling a dog to carry loads as recited in claim 9 wherein said Y-strap assembly means and said second strap assembly means have an elastic means for providing additional length.

13. A method for enabling a dog to carry loads as recited in claim 9 further comprising a third strap assembly means for maintaining said flexible surface member in position having opposing ends attached to said flexible surface member rearward of said second strap assembly means.

14. An apparatus enabling a dog to carry loads comprising:
   (a) a pack means for containing loads,
   (b) a Y-shape strap assembly means for maintaining said pack means for containing loads in a desired position, said Y-shape strap assembly means upper double ends attached to the front of said pack means for containing loads and opposing single end of said Y-shape strap assembly means attached to an unopposed end of a tee shape means for connecting three straps,
   (c) a second strap assembly means for maintaining said pack means for containing loads in a desired position having two sections, each attached centrally to said pack means for containing loads with each opposing end attached to an opposing end of said tee shape means and,
   (d) a third strap assembly means for maintaining said pack means for containing loads in position having opposing ends opposingly attached to said pack means for containing loads rearward of said second strap assembly means.

15. An apparatus enabling a dog to carry loads comprising:
   (a) a pack means for containing loads,
   (b) a Y-shape strap assembly means for maintaining said pack means for containing loads in a desired position, said Y-shape strap assembly means double ends attached to the front of said a pack means for containing loads and opposing single end of said Y-shape strap assembly means attached to an unopposed end of a tee shape means for connecting three straps and,
   (c) a second strap assembly means for maintaining said pack means for containing loads in a desired position having two sections, each attached rearward to said pack means for containing loads with each opposing end attached to an opposing end of said tee shape means.

16. A method for enabling a dog to carry loads comprising the steps of:
  (a) providing a pack means for containing loads,
  (b) attaching a Y-shape strap assembly means for maintaining said pack means for containing loads in a desired position, said Y-shape strap assembly means having upper double ends attached to the front of said pack means for containing loads and opposing single end of said Y-shape strap assembly means attached to an unopposed end of a tee shape means for connecting three straps and,
  (c) attaching a second strap assembly means for maintaining said pack means for containing loads in a desired position having two sections, each attached rearward to said pack means for containing loads with each opposing end attached to an opposing end of said tee shape means.

* * * * *